United States Patent [19]

Killworth et al.

[11] Patent Number: 5,170,985
[45] Date of Patent: Dec. 15, 1992

[54] BODY MOUNT FOR AN AUTOMOBILE

[75] Inventors: Kenneth E. Killworth, Columbia City; Thomas A. Knurek, Auburn; Robert A. Pritchett, Warsaw, all of

[73] Assignee: Cooper Tire & Rubber Company, Findlay, Ohio

[21] Appl. No.: 822,866

[22] Filed: Jan. 21, 1992

[51] Int. Cl.$^5$ .......................................... B62D 27/04
[52] U.S. Cl. ..................... 248/635; 248/634; 267/141.1; 296/35.1
[58] Field of Search ............... 248/634, 635, 560, 638, 248/632; 296/35.1; 267/281, 141.1, 153, 140.1; 180/312

[56] References Cited

U.S. PATENT DOCUMENTS

| | | | |
|---|---|---|---|
| 2,972,498 | 2/1961 | Kelley | 296/35.1 X |
| 3,193,237 | 7/1965 | Adams | 248/358 |
| 3,218,101 | 11/1965 | Adams | 296/35 |
| 3,479,081 | 11/1969 | Schaaf | 296/35.1 |
| 3,622,194 | 11/1971 | Bryk | 296/35 R |
| 3,809,427 | 5/1974 | Bennett | 296/35.1 |
| 4,720,075 | 1/1988 | Peterson | 248/635 |
| 4,781,361 | 11/1988 | Makibayashi | 180/312 X |
| 4,783,039 | 11/1988 | Peterson | 248/635 |
| 4,844,430 | 7/1989 | Miya | 267/140.1 |
| 4,921,203 | 5/1990 | Peterson | 248/635 |

FOREIGN PATENT DOCUMENTS

| | | | |
|---|---|---|---|
| 1011319 | 5/1977 | Canada | 296/35.1 |
| 186783 | 10/1984 | Japan | 296/35.1 |
| 294928 | 2/1954 | Switzerland | 248/635 |

Primary Examiner—J. Franklin Foss
Attorney, Agent, or Firm—Joseph G. Nauman

[57] ABSTRACT

The present invention provides a mounting fixture for mounting a vehicle body to a support member or vehicle frame. The mounting fixture includes an upper and a lower assembly attached to either side of a non-circular aperture in the frame member. Each of the upper and lower assemblies includes an elongated tubular member and a flange portion extending therefrom wherein the lower tubular member is received in telescoping relationship within the upper tubular member. Upper and lower cushioning members are positioned over the upper and lower tubular members and between the flanges and the frame member to provide a cushion between the frame and the vehicle body. The upper cushioning member includes a non-circular extension corresponding to the shape of the aperture in the vehicle frame whereby relative rotation between the upper cushioning member and the vehicle frame is prevented. The lower assembly is provided with a non-circular member for cooperating with a non-circular portion of the upper assembly whereby relative rotation of the lower assembly relative to the frame is also prevented. The mount assembly further includes a resilient insert which is receivable within the upper and lower tubular members for engaging ledge surfaces therein to maintain the tubular members in telescoping engagement with each other.

22 Claims, 7 Drawing Sheets

BODY MOUNT FOR AN AUTOMOBILE

BACKGROUND OF THE INVENTION

The present invention relates to a body mount for securing a part to a frame, and more particularly, to a vibration absorbing mount for securing an automobile body to a frame.

It is common in the automotive industry to secure and support an automobile body on its frame using body mounts having resilient insulators adapted to insulate the body against vibrations and shocks. Typical such body mounts are disclosed in U.S. Pat. Nos. 3,809,427, 3,622,194, 3,193,237 and 3,218,101. Those patents disclose upper and lower insulators, formed as cylinders with an aperture along their central axis, positioned on opposite sides of a horizontal frame portion. The mount comprises an upper retainer or spacer having a base and a tubular extension, and a lower retainer or thimble also having a base and a tubular extension. The upper and lower insulator cylinders are received around the respective tubular extensions. One of the tubular extensions includes at least a portion of its length sized to be received within the other tubular extension.

In use, the upper and lower parts of the mount, e.g. the spacer and thimble and the corresponding insulator, are placed on opposite sides of a support. For example, when used as a vehicle body mount, these parts would be located in alignment with an aperture in a frame. It is then necessary to hold these parts so assembled temporarily, while the vehicle body is placed on the several mounts, and the retaining bolts are passed through an aperture in the vehicle body, through the combined parts of the mount, and secured. The nut for securing such bolt may be part of the mount thimble.

To retain the so-assembled mount parts in place on the frame, a fixture has been used to pre-compress the insulators and to force the lower tubular extension into the upper tubular extension. In the system disclosed in said U.S. Pat. No. 4,809,427 a portable ram is then used to flare the end of the lower or thimble tube outwardly around a shoulder formed in the spacer tube. In the other patents mentioned, interengaging parts on (or associated with) the telescoped tubes act to hold them together when the mount is compressed by a workman. With the body then in position such that its openings are aligned with the openings through the mount tubes, a bolt is inserted therein and threaded into a weld nut or equivalent to secure the vehicle body on its frame.

However, the fixtures must be adapted to prevent rotation of the tubular members during bolt tightening to ensure the proper mating of the tubular members. The use of such a fixture greatly increases the cost of tooling, the number of assembly steps required, and the assembly time. U.S. Pat. Nos. 4,720,075 and 4,783,039 disclose improvements in such body mounts in which the two telescoping tubes are provided with mutually engaging polygonal walls which prevent relative rotation between the spacer and thimble.

What is needed, therefore, is an automobile body mount in which the lower insulator and the lower retainer are held in place without the need for a fixture, such that the body mount automatically engages and supports the lower insulator and the lower retainer when the retainers are moved toward one another during assembly. Further, a body mount is needed which includes means for preventing relative rotation between upper and lower retainers as well as between the retainers and the structure to which the body mount is attached.

SUMMARY OF THE INVENTION

The present invention provides a mounting fixture for mounting a vehicle body to a support member or vehicle frame. The mounting fixture includes an upper and a lower retainer assembly which may be attached to either side of an aperture or mounting hole in the frame member in preparation for receiving a vehicle body.

The upper and lower retainer assemblies include cushioning members which are preferably formed of a resilient material such as rubber. The upper cushioning member includes a rigidly reinforced cap member having an extended non-circular end portion. The non-circular end portion of the cap member is received within a corresponding hole in the frame member thereby to prevent relative rotation between the frame and the cap member. The upper assembly further includes a non-circular tubular member having a flange at one end thereof for engaging the upper cushioning member. The upper tubular member passes through the upper cushioning member and cooperates with support members located in the end portion of the cap thereby to prevent relative rotation between the upper tube and the cap member.

The lower retainer assembly includes a non-circular tubular member passing through the lower cushioning member and a flange extending from the tubular member and engaging one end of the cushioning member. The lower tubular member has a cross-sectional shape corresponding to that of the upper tubular member and is adapted to be received in telescoping relationship into the upper tubular member whereby relative rotation between the tubular members is prevented.

The lower flange carries a threaded nut such that when the mounting fixture is in place on a vehicle frame, a threaded fastener may be used to attach a body to the mounting fixture, and the configuration of the mounting fixture will prevent rotation of the threaded nut relative to the frame.

The present invention also provides an inset member formed of a resilient material for holding the upper and lower tubular members together on either side of the vehicle frame prior to mounting the body thereto. Each of the tubular members has an interior wall including means defining a ledge extending radially from each of the interior walls. The insert is provided with a body portion and first and second contact means attached to the body portion wherein the first contact means may be received within the lower tubular member to engage the ledge therein and the second contact means may be received within the upper tubular member to engage the ledge therein. With the first and second contact means in engagement with their respective ledges, the first and second tubular members are held in telescoping relationship to each other without further means to hold the upper and lower retainer assemblies in place.

In another embodiment of the present invention, the extended end portion of the cap member of the upper retainer assembly may be dimensioned to extend beyond the aperture in the frame to engage an aperture in the lower cushioning member. The aperture in the lower cushioning member is shaped to correspond to the cross-sectional shape of the end portion of the cap whereby relative rotation between the cap member and the lower cushioning member is prevented.

In addition, the lower flange carrying the threaded nut is bonded to the lower cushioning member such that the force preventing rotation of the lower flange and threaded nut is transmitted from the upper retainer assembly cap to the lower cushioning member and the flange attached thereto.

In a further embodiment of the invention, the upper retainer assembly is formed with the cushioning member and extended end portion, molded integrally as a single element such that a separate cap member is not required.

Therefore, the principal object of this invention, is the provision of an automobile body mount in which upper and lower retainers and insulators may be held in place without the need of a fixture during connection of parts of the body via the mount, as well as providing an automobile body mount in which relative rotation between the mount and the frame during assembly is limited.

Other objects and advantages of the invention will be apparent from the following description, the accompanying drawings and the appended claims.

DESCRIPTION OF THE PREFERRED EMBODIMENT

Figure 1:
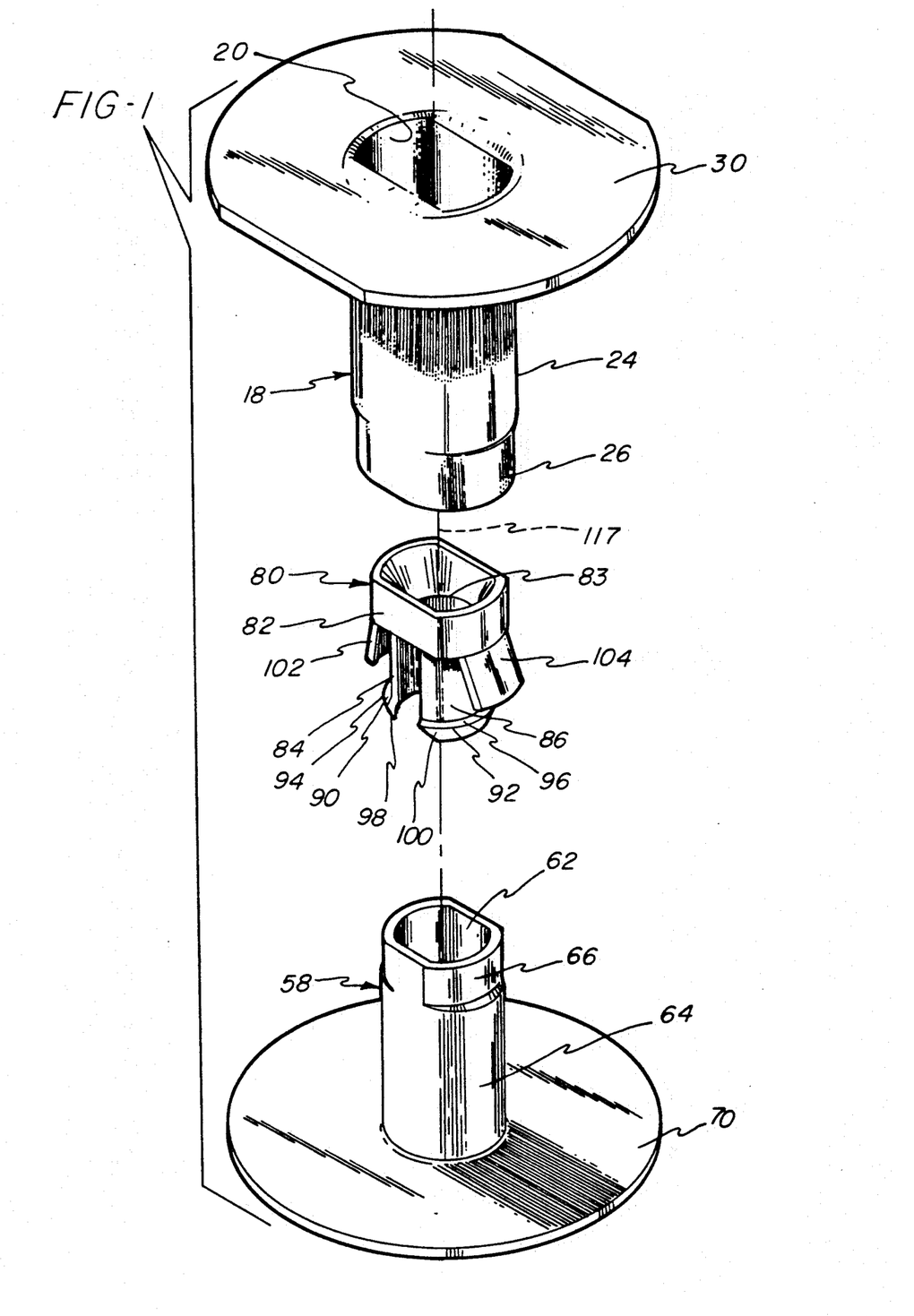
FIG. 1 is an exploded perspective view of the body mount of the present invention without the resilient members.
Figure 2:
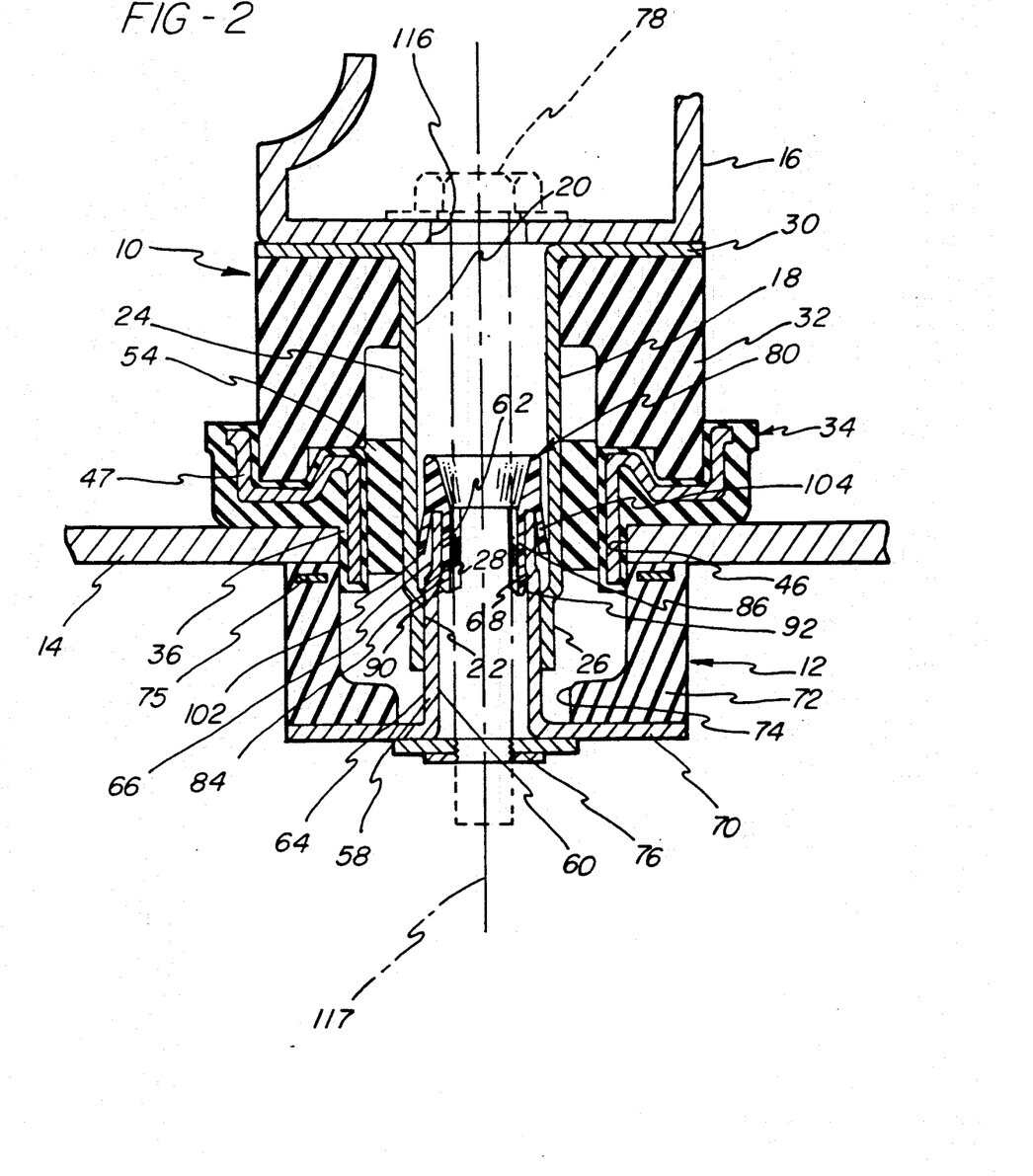
FIG. 2 is an elevational cross-sectional view of the body mount assembled to a frame member.

Referring to FIGS. 1 and 2, the mounting fixture of the present invention generally includes a first or upper retainer assembly 10 and a second or lower retainer assembly 12. The upper and lower retainer assemblies 10, 12 are adapted to be positioned on either side of a support or frame member 14 and are joined in mating contact with each other to form a support for a vehicle body, a portion of which is indicated at 16.

The upper retainer assembly 10 includes a tubular body portion 18 having interior wall portions 20, 22 defining first and second interior cross-sectional areas of tubular member 18 wherein the first cross-sectional area defined by wall 20 is larger than the second cross-sectional 10 area defined by wall 22. Further, in the preferred embodiment, the exterior of the tubular member 10 is formed with first and second exterior wall portions 24, 26 located opposite from the first and second interior wall portions 20, 22, respectively. The first exterior wall portion 24 defines a first exterior cross-sectional area greater than a second cross-sectional area defined by the second exterior wall portion 26.

A relatively sharp transition is formed between the first and second interior wall portions 20, 22 to define a first ledge 28 extending in a radial direction from wall portions 20, 22. The first ledge 28 forms a catch surface adjacent to one end of the tubular member 18 for purposes to be described below.

Figure 3:
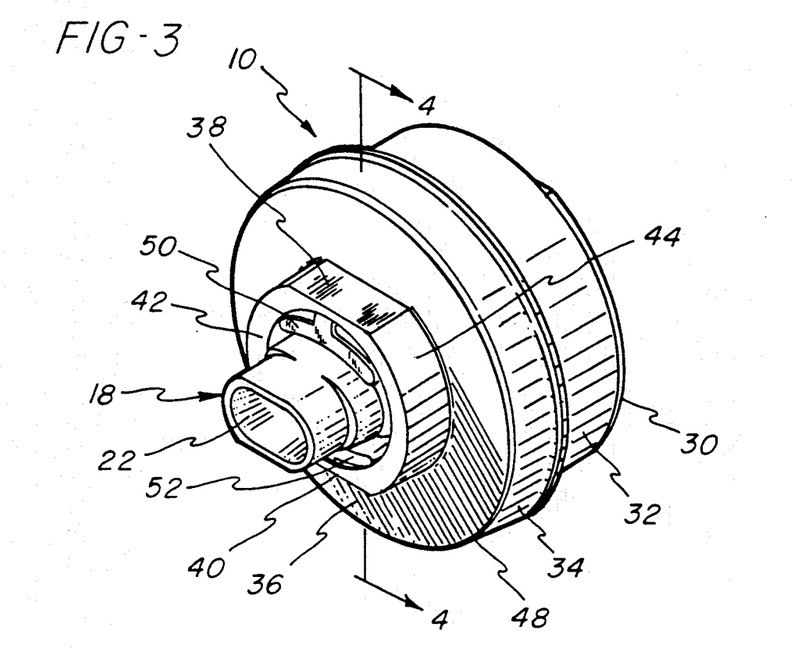
FIG. 3 is a perspective view of the upper retainer assembly.

The upper retainer assembly 10 further includes a flange portion 30 which is preferably formed integrally with the tubular member 18 and which is located at an end of the tubular member 18 distal from the end containing ledge 28. Referring to FIGS. 2 and 3, the upper retainer assembly 10 is provided with a cylindrical resilient member including a cushioning member 32. The cushioning and cap members 32, 34 are preferably formed of rubber. Further, the cushioning member 32 and cap member 34 include means defining apertures which receive and engage the tubular member 18 in frictional contact, thereby to maintain the members 32, 34 in a predetermined axial position on the upper tubular member 18.

The cap member 34 includes an extended end portion 36 which is preferably formed with two opposing flat sides 38, 40 joined by opposing curved sections 42, 44 to define a cross-section in the shape of an oblate circle. The frame member 14 is provided with a hole 46 having the same cross-sectional shape as the extended portion 36 of the upper retainer assembly 10 whereby rotation of the upper retainer assembly 10 relative to frame 14 is prevented.

Figure 4:
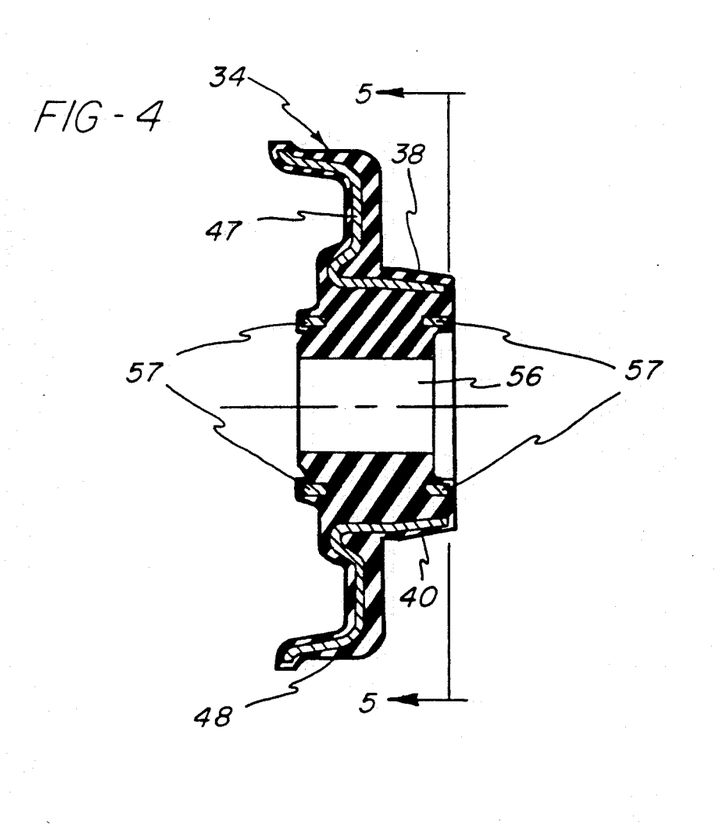
FIG. 4 is a cross-sectional view of the cap portion of the upper retainer assembly, taken along line 4—4 in FIG. 3.

In addition, the cap 34 is provided with a reinforcing structure including an outer reinforcing insert 47 formed of an inelastic material such as steel which is molded into cap member 34. As may be seen in FIGS. 4 and 5, the insert 47 is preferably shaped to follow the contours of the extended end 36 and of a flanged base portion 48 of cap member 34, such that cap member 34 is formed as a substantially rigid member which is capable of resisting deformation resulting from torque forces tending to rotate the upper assembly 10 relative to frame member 14.

Also, the first tubular member 18 may be formed with a non-circular cross-section and preferably has opposing substantially flat sides to define a cross-section generally in the shape of an oblate circle, as seen in FIGS. 1 and 3, to prevent relative rotation between the tubular portion 18 and cap member 34.

Figure 5:
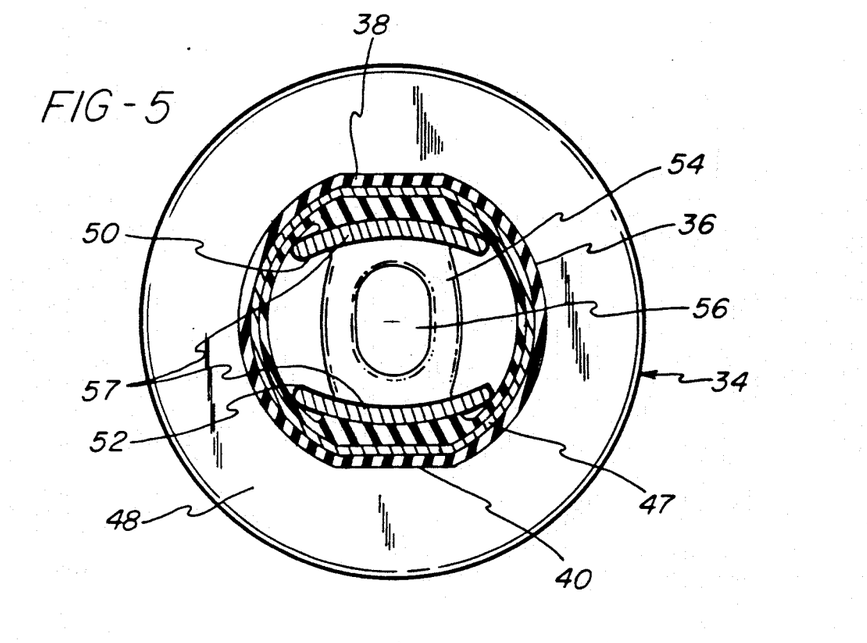
FIG. 5 is a cross-sectional view of the cap portion taken along line 5—5 in FIG. 4.

Referring to FIG. 5, the reinforcing structure of cap member 34 further includes a pair of elongated stiffening support members 50, 52 which are supported in substantially fixed positions relative to each other within the outer ring of the extended end 36. A relatively flexible rubber ring member 54 is formed integrally with cap 34 and is supported between the elongated support members 50, 52 and includes the aperture 56 for receiving the upper tubular member 18 therethrough.

As may be seen in FIG. 3, the tubular member 18 is positioned within cap member 34 such that its flattened sides are aligned substantially parallel to the flat sides 38, 40 of cap member 34. Further, support members 50, 52 act to prevent rotation of tubular member 18 relative to cap 34 one tubular member 18 is positioned within aperture 56 (see FIG. 4). To this end, support members 50, 52 include elongated rigid metal inserts 57, as may be seen in FIGS. 4 and 5. Inserts 57 extend lengthwise of and are located directly adjacent to the flattened sides of upper tubular member.18. With inserts 57 thus positioned between tubular member 18 and the rigidly reinforced sides 38, 40, tubular member 18 is effectively prevented from rotating relative to cap 34.

Referring again to FIGS. 1 and 2, lower retainer assembly 12 includes a lower tubular member 58 formed with an oblate circular cross-sectional shape substantially similar to that of upper tubular member 18. Lower tubular member 58 includes third and fourth interior cross-sectional areas, respectively, wherein the fourth cross-sectional area is smaller than the third cross-sectional area. Further, tubular member 58 includes third and fourth exterior wall portions 64, 66 located opposite from the third and fourth interior walls 60, 62 to define third and fourth cross-sectional areas.

A relatively sharp transition between the third and fourth interior walls 60, 62 defines a second ledge 68 extending in a radial direction within the interior of lower tubular member 58, and the transition from the third to fourth exterior walls 64, 66 substantially corresponds to the axial location of second ledge 68.

Referring to FIGS. 1 and 2, lower retainer assembly 12 is further fitted with a flange portion 70 which is preferably formed integrally with second tubular member 58. Flange portion 70 acts to retain a second cylindrical resilient cushioning member 72 positioned over the second tubular member 58. Cushioning member 72 is formed with a substantially circular hole 74 therethrough for receiving tubular member 58, and cushioning member 72 is preferably immovably fixed to flange portion 70. In addition, the portion of hole 74 distal from flange 70 is formed with a sufficient diameter to receive the extended end 36 of cap member 34, and a circular reinforcing member 75 is molded into cushioning member 72 to stiffen member 72 in the area where extended end 36 is received.

Figure 10:
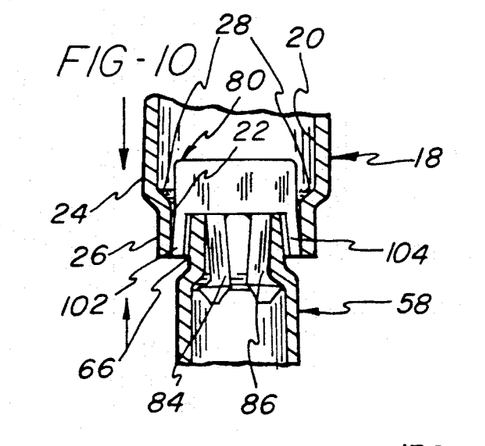

The cross-sectional area defined by the third exterior wall portion 64 i selected such that it is less than the interior cross-sectional area defined by first interior wall 22, whereby lower tubular member 58 may be received within first tubular member 18 in a sliding fit during assembly of upper and lower retainer assemblies 10, 12 to frame 14, as seen in FIGS. 2 and 10. Further, a threaded nut 76 is attached to lower flange portion 70 such that a threaded fastener 78 may be used to draw the upper and lower retainer assemblies 10, 12 together in a body mounting operation the be described further below.

In order to facilitate attachment of the body mounting fixture to frame 14 in preparation for attachment of a body 16, the present invention further provides an insert member 80 for holding upper and lower tubular members 18, 58 in telescoping relationship with each other. As may best be seen in FIGS. 1 and 6, insert 80 includes a body portion 82 having a cross-sectional shape corresponding to the cross-sectional shape of upper and lower tubular members 18,58 and defining a cross-sectional area slightly less than the cross-sectional area defined by first interior wall portion 22 (see FIG. 10) such that body portion 82 of insert 80 may slide freely within upper tubular member 18. In addition, body portion 82 has an aperture 83 therethrough, thus insert 80 is formed as a hollow member.

A pair of legs 84, 86 extend downwardly from body portion 82 and are oriented substantially parallel to a central longitudinal axis 88 of body portion 82. Each of leg members 84, 86 includes a detent member 94, 96 and a cam surface 98, 100, the purpose of which is described further below. Leg members 84, 86 are formed such that they may be positioned within lower tubular member 58 with latch surfaces 94, 96 in engagement with second ledge portion 68, as seen in FIGS. 8 and 9.

Figure 8:
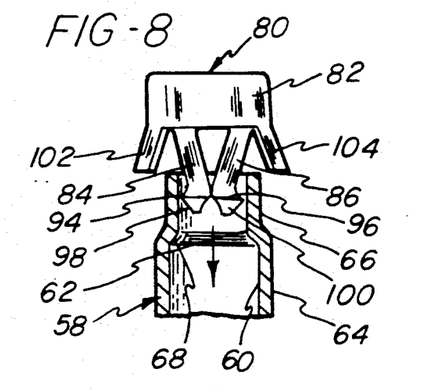
FIGS. 8–11 are elevational views showing the steps mating the upper and lower tubular members together using the insert, wherein the tubular members are shown in cross-section.
Figure 9:
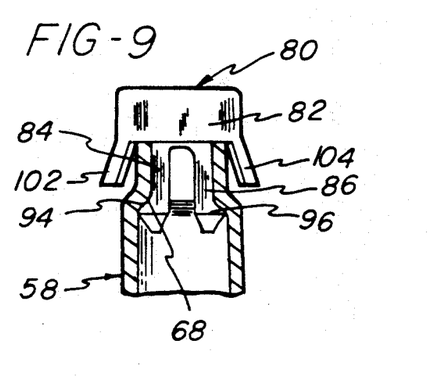

In order to facilitate insertion of leg members 84, 86 through the cross-sectional area defined by fourth internal wall 62, insert 80 is formed of a resilient plastic material such as nylon and legs 84, 86 are positioned on body portion 82 in spaced relationship to each other, and are so dimensioned, that they may be flexed inwardly toward central axis 88 until latch surfaces 94, 96 clear second ledge 68, as seen in FIG. 8.

Figure 6:
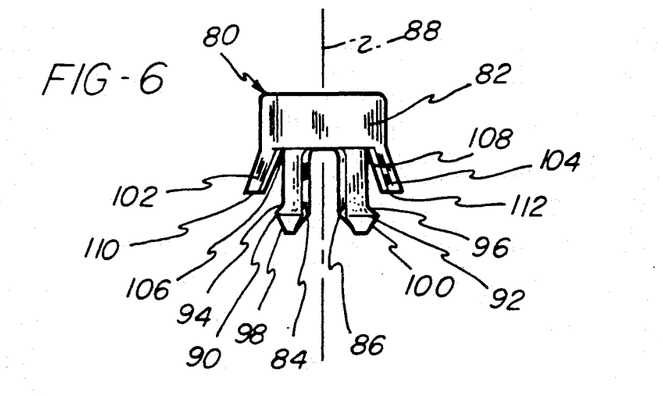
FIG. 6 is an elevational view of the insert for holding the upper and lower retainer assemblies together.
Figure 11:
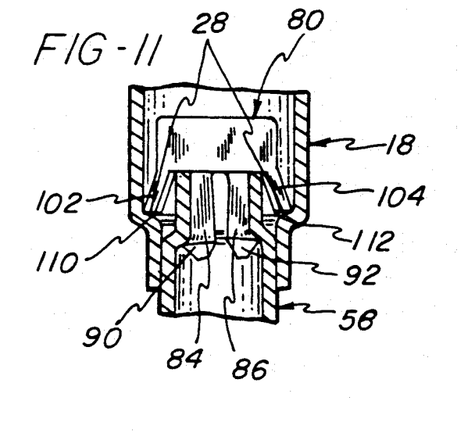

Insert 80 is further provided with catch portions in the form of resiliently movable wing members 102, 104 extending from body portion 82 at locations radially outward leg members 84, 86 to define a shelf portion 106, 108 on either side of the lower surface of body portion 82, as seen in FIG. 6. Wing members 102, 104 angle radially outward from body portion 82 and include contact surfaces 110, 112 for engaging the first ledge 28 of tubular member 18, as illustrated in FIG. 11.

Figure 7:
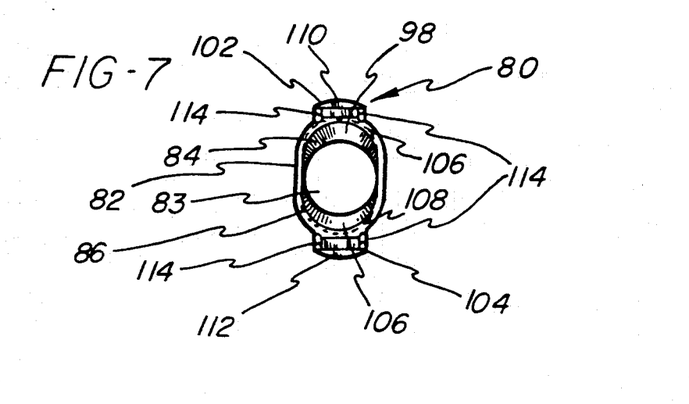
FIG. 7 is a bottom view of the insert.

In addition, as seen in FIG. 7, wing members 102, 104 may be formed with reinforcing ribs 114 located along the interior longitudinal edges of wing members 102, 104. Ribs 114 increase the stiffness of wings 102, 104 and thus provide a firm outward biasing force for those wings.

Use of insert 82 in the present invention is illustrated in FIGS. 8-11. As seen in FIG. 8, as leg members 84, 86 are inserted into lower tubular member 58, cam surfaces 98, 100 on detent members 90, 92 cause leg members 84, 86 to move inwardly toward each other to allow the radially outermost portions of detent members 90, 92, as defined by the intersection of contact surfaces 94, 96 and cam surfaces 98, 100, to pass through the interior cross-sectional area defined by fourth wall portion 62.

With insert 82 positioned on lower tubular member 82 (FIG. 9) shelf portions 106 and 108 will engage an end surface of member 58 and thereby limit further axial movement of legs 84, 86 into tubular member 58. In this position, contact surfaces 94, 96 will also engage second ledge 68 to positively prevent insert 80 from being extracted from lower tubular member 58.

As seen in FIG. 10, the combined structure of the lower tubular member 58 and insert 80 is then inserted into upper tubular member 18, which has been positioned with cap member 34 within frame aperture 46 (not shown in FIGS. 10 and 11). As wing members 102, 104 are inserted past the first interior wall portion 22, they are caused to fold down around fourth outer wall portion 66 of lower tubular member 58. Subsequently, as lower member 58 is moved up into its final position (FIG. 11) wing members 102, 104 flex back into their outer position such that contact surfaces 110, 112 engage first ledge 28. With detentes 90, 92 and wing members 102, 104 thus engaged with their respective ledges 68, 22, the upper and lower tubular members 18, 58 are held in telescoping relationship to each other on either side of frame member 14.

Referring to FIG. 2, with upper and lower assemblies 10, 12 thus in position to form a mounting fixture, a body 16 is placed on the upper flange portion such that a hole 116 formed in body 16 is aligned with a central axis 17 passing through tubular members 18, 58 and insert 80 (see FIG. 6), wherein axis 88 of insert 80 coincides with central axis 117. The threaded fastener 78 may then be passed through aperture 116, tubular members 18 and 58, and insert 80 to engage nut member 76. As fastener 78 is turned to draw body 16 and upper and lower assemblies 10, 12 together, the shape of end portion 36 cooperates with aperture 46 in the frame to prevent rotation of upper retainer assembly 10 relative to frame 14. In addition, the cooperating non-circular cross-section of upper and lower assemblies 18, 58 acts to prevent relative rotation between the two tubular members such that the nut portion 76 on lower flange 70 is positively held against rotation relative to frame 14 during tightening of fastener 78. At the conclusion of the fastener tightening operation, the body mount will appear substantially as shown in FIG. 2.

Figure 12:
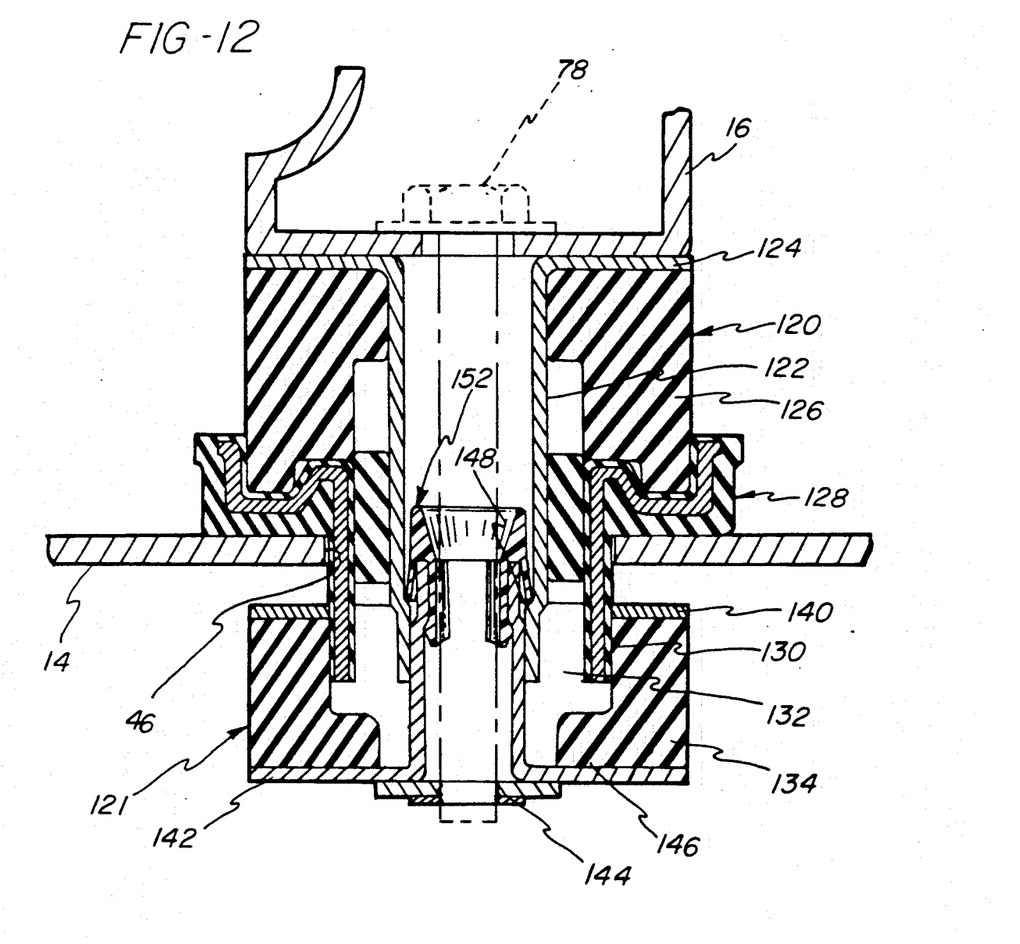
FIG. 12 is a vertical cross-sectional view of a second embodiment of the invention.
Figure 13:
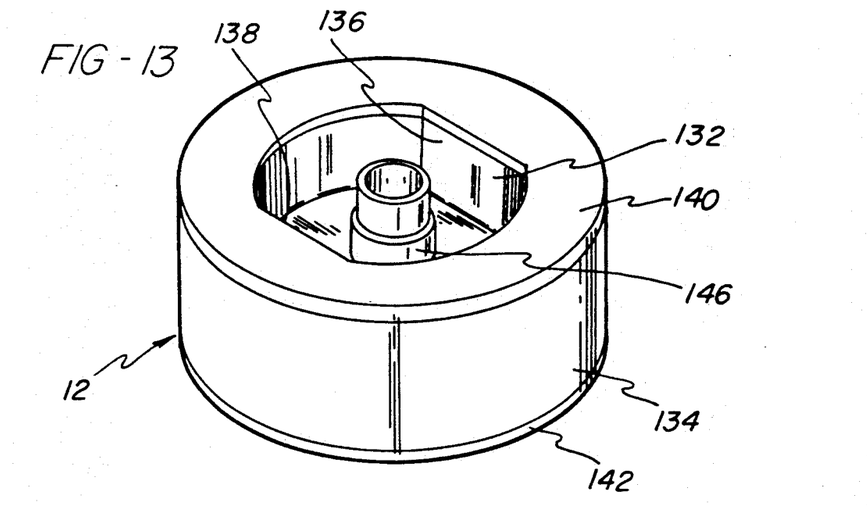
FIG. 13 is a perspective view of a lower retainer assembly for the second embodiment.

In an alternative embodiment of the invention, as shown in FIGS. 12 and 13, upper and lower retainer assemblies 120, 121 are provided, as in the previous embodiment. Upper retainer assembly 120 includes a tubular member 122, flange portion 124 and a resilient member formed of a cushioning member 126 and a rigidly reinforced cap member 128. As in the previous embodiment, cushioning member 126 is sandwiched between flange 124 and cap member 128. Further, it should be noted that FIG. 12 shows the upper and lower retainer assemblies 120, 121 in position on the frame member just after engagement of assemblies 120, 121 with each other and prior to the fastener 78 being tightened.

Cap member 128 is provided with an extended end 130, having a cross-sectional configuration similar to that of the previous embodiment, which is dimensioned to extend through and beyond hole 46 in fame member 14. Thus, the extended end 130 will prevent relative rotation between cap 128 and frame 14. Further, the portion of end 130 extending beyond frame 14 is positioned to engage an aperture 132 in a lower resilient cushioning member 134 which is positioned over a lower tubular member 146 of lower retainer assembly 121.

As see in FIG. 13, aperture 132 is formed with a shape corresponding to the shape of extended end 130, and includes a pair of flat sides 136, 138 for cooperating with end 130 to prevent relative rotation between cap 128 and lower resilient member 134. Further, in the preferred form of this embodiment a rigid plate 140, formed of metal or plastic, is attached to resilient member 134 for forming a rigid structure to engage end 130. Plate 140 includes an aperture of a size and shape corresponding to the size and shape of aperture 132 to receive the extended end 130 therethrough.

A lower flange 142 extends from the lower tubular member 146 and the lower resilient member 134 is bonded to lower flange 142 by conventional means, such as an adhesive, thereby to prevent relative rotation between the flange 142 and resilient member 134. As in the previous embodiment, a threaded nut 144 is affixed to flange 142 for engaging threaded fastener 78 during a body mounting operation. Thus, it should be apparent that the cooperating upper and lower retaining members 126, 134 act to directly limit rotation of threaded nut 144. In addition, should also e apparent than one or both of the upper and lower tubular members 122, 146 may be formed with a circular cross-section since the torsional force for preventing rotation of nut 144 is not transmitted through tubular members 122, 146.

It should be noted that tubular members 122, 146 of this embodiment are formed with ledges 148, 150 as in the previous embodiment. Further, an insert 152 may be provided for cooperating with ledges 148, 150 to hold members 122, 146 in telescoping relationship wherein insert 152 is formed with a circular cross-sectional shape corresponding to the shape of tubular members 122, 144.

Figure 14:
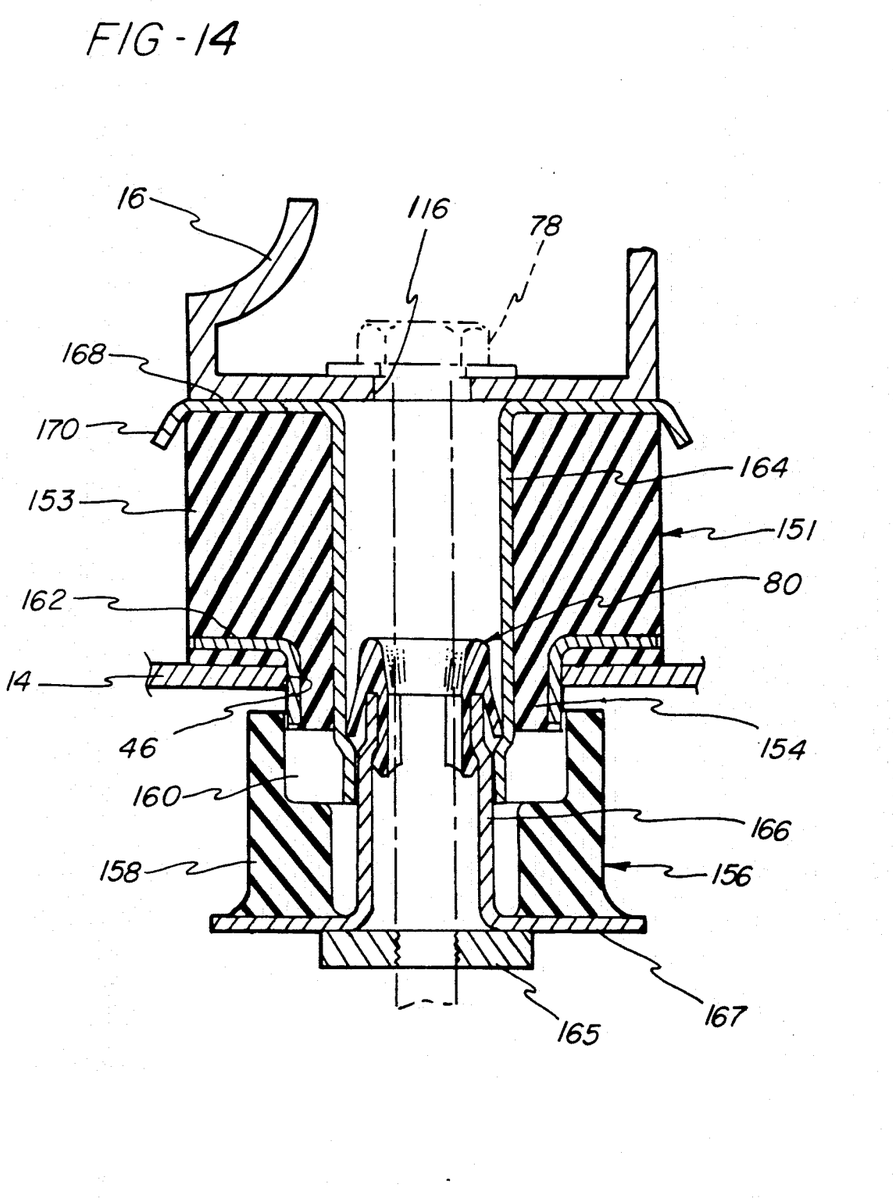
FIG. 14 is a vertical cross-sectional view of a third embodiment of the body mount of the present invention.

In a third embodiment of the body mount, as seen in FIG. 14, the body mount is formed in a manner similar to that shown in FIG. 2 except that the upper retainer assembly 151 includes an integrally formed cushioning body portion 153 and extended end portion 154.

As in the embodiment of FIG. 2, the lower retainer assembly 156 (FIG. 14) is provided with a cushioning member 158 including a circular hole 160 for receiving the extended end portion 154. End portion 154 is preferably formed having an oblate circular cross-sectional shape corresponding to the oblate circular shape of hole 46 in frame member 14, thereby to prevent relative rotation between upper retainer assembly 151 and frame member 14. Further, a rigid reinforcing member 162 preferably formed of metal is molded into cushioning body 152 and extends along end portion 154, and is preferably formed with a cross-section corresponding to that of extended portion 154 to facilitate cooperation between upper retainer assembly 151 and hole 46 to prevent rotation of the body mount.

In the position shown in FIG. 14, the upper and lower retainer assemblies 151 and 156 have been positioned in initial engagement with each other prior to tightening of fastener 78 to draw the body mount into its final mounting position in sandwiching contact with frame member 14. Upper and lower tubular members 164, 166 are formed with oblate circular cross-sections in a manner similar to that described in the embodiment of FIG. 2, to prevent relative rotation between the upper and lower retainer assemblies 151, 156. In addition, an insert 80 is provided similar to that shown in the embodiment of FIG. 2 for holding the upper and lower retainer assemblies 151, 156 in association with each other in preparation for tightening of fastener 78, and a threaded nut 165 is attached to a flange portion 167 extending from lower tubular member 166 for cooperation with fastener 78.

Thus, it should be apparent that the embodiment of FIG. 14 may be used in a manner similar to that described for the embodiment of FIG. 2 and differs from the embodiment of FIG. 2 only in that the extended end portion 154 is formed as a continuation of the cushioning member 152. Further, a flange 168 extending from the upper tubular member 164 may be provided with a lip portion 170 for surrounding the cushioning portion 152 of upper retainer assembly 151.

Thus, the various above-described embodiments act to prevent relative rotation between the frame member and threaded nut by transmitting a torsional resisting force from the frame, through the extended end portion of the upper retainer assembly, to the lower retainer assembly flange and associated nut.

With the present invention, the upper and lower retainer assemblies may be conveniently positioned on either side of a frame member, and hand manipulated into mating engagement with each other, without the aid of additional tools, to form a mounting fixture. Subsequently, a body may be positioned on top of the mounting fixture, and a bolt passed through a portion of the body and through the fixture to engage the nut on the lower flange of the fixture. With the nut held against rotation by the fixture, the bolt may be rotated to tighten down and fasten the body to the frame.

Further, the present invention provides a convenient means for holding the upper and lower retainer assemblies in association with each other when the insert is positioned in place, such that it is not necessary to immediately engage the fastener in the body mount after initial assembly of the mount. It should also be noted that prior to positioning the insert in place on the lower retainer assembly, the upper and lower retainer assemblies may be easily assembled and disassembled to check the fit of the body mount to the frame member before beginning the final mounting operation.

While the forms of apparatus herein described constitutes preferred embodiments of this invention, it is to be understood that the invention is not limited to these precise forms of apparatus, and that changes may be made therein without departing from the scope of the invention which is defined in the appended claims.

What is claimed is:

1. A mount assembly for securing a body to a support member, comprising,
   first and second retainer assemblies,
   said first retainer assembly including a first tubular member having and interior wall and means defining a first ledge extending radially from said interior wall,
   said second retainer assembly including a second tubular member having an interior wall and means defining a second ledge extending radially from said interior wall of said second member, said second tubular member being dimensioned to be received in said first tubular member in telescoping relationship thereto,
   an insert including a body portion and first and second contact means attached to said body portion,
   said first contact means being receivable within said second tubular member to engage said second ledge, and
   said second contact means being receivable within said first tubular member to engage said first ledge when said first contact means is in engagement with said second ledge thereby to hold said first and second tubular members in telescoping relationship with each other.

2. The mount assembly of claim 1 wherein said first and second ledges are defined by dimensional changes in said interior walls of said first and second tubular members at a transition from a first to a second cross-sectional area of each of said first and second tubular members, respectively.

3. The mount assembly of claim 1 wherein said body portion of said insert has a central longitudinal axis and said first contact means include a plurality of elongated leg members attached to and extending from said body portion substantially parallel to said axis.

4. The mount assembly of claim 3 wherein said leg members include detent means located distal from said body portion and extending radially away from said central axis, said detent means including contact surfaces for contacting said second ledge and thereby preventing said first contact means from being extracted from said second tubular member.

5. The mount assembly of claim 4 wherein said detent means include tapered portions, said tapered portions angling toward said central axis in a direction away from said body portion to cam said leg members inwardly as said leg members are inserted into said second tubular member.

6. The mount assembly of claim 3 wherein said leg members are resiliently movable relative to said body portion.

7. The mount assembly of claim 2, wherein said second contact means include a plurality of wing members extending radially outwardly from said body portion of said insert.

8. The mount assembly of claim 7 wherein said wing members are attached to said body portion at locations radially outward from attachment points for said first contact means whereby a shelf is formed between said wing members and said first contact means, said shelf cooperating with and end of said second tubular member to limit movement of said first contact means into said second tubular member.

9. The mount assembly of claim 7 wherein said wing members are resiliently movable relative to said body portion such that said wing members may fold down around an outer portion of said second tubular member as aid second tubular member is inserted into said first tubular member.

10. The mount assembly of claim 7 wherein said wing members each include a surface on an end distal from said body portion for contacting said first ledge and thereby preventing said insert from being extracted from said first tubular member.

11. The mount assembly of claim 1 wherein said first and second retainer assemblies further include first and second flange portions extending from said first and second tubular members, and first and second resilient members positioned on said first and second tubular members adjacent to said flange portions.

12. The mount assembly of claim 11 wherein said first resilient member includes a non-circular extension for engaging a corresponding non-circular aperture in the support member thereby to prevent relative rotation between said first resilient member and the support member.

13. The mount assembly of claim 12 wherein said first and second retainer assemblies are provided with cooperating non-circular mating surfaces for preventing relative rotation between said first and second assemblies.

14. The mount assembly of claim 1 wherein said first and second tubular members are formed with cooperating non-circular cross-sections and said body portion of said insert is formed with a cross-sectional shape corresponding to the interior cross-section of said first and second tubular members.

15. A mount assembly for securing a body to a support member, comprising
   a first retainer assembly having a first tubular member, a first flange portion extending from one end of said first tubular member and a first resilient member positioned on said first tubular member,
   a second retainer assembly having a second tubular member, a second flange portion extending from one end of said second tubular member and a second resilient member positioned on said second tubular member,
   said second flange portion including a threaded portion for engaging a threaded fastener,
   said second tubular member being received in telescoping relationship with said first tubular member,
   means for preventing relative rotation between said support member and said second flange portion including an extension formed on said first resilient member and having a predetermined non-circular cross-section for cooperating with a corresponding non-circular aperture in the supporting member, and said first resilient member including non-resilient reinforcing means for resisting deformation of said non-circular extension upon application of a torsional force to said first resilient member.

16. The mount of claim 15 wherein said means for preventing relative rotation include side wall portions formed on said first tubular member and defining a non-circular cross-section of said first tubular member, and non-resilient support means on said first resilient member located radially inwardly from said reinforcing means for cooperating with said non-circular cross-section to prevent relative rotation between said first tubular member and said first resilient member.

17. The mount assembly of claim 16 wherein said means for preventing relative rotation include mating parts of corresponding non-circular cross-section on said first and second tubular members to prevent relative rotation between said first and second tubular members.

18. The mount assembly of claim 16 wherein said first tubular member includes a pair of opposing substantially flat sides for cooperating with said non-resilient support means.

19. The mount assembly of claim 15 wherein said means for preventing relative rotation includes a bonded joint between said second flange portion and said second resilient member, said second resilient member including means defining an aperture for receiving said extended portion, said aperture in said second resilient member having a cross-section corresponding to the non-circular cross-section of said extended portion whereby relative rotation between said first resilient member, said second resilient member and said second flange is prevented.

20. The mount assembly of claim 19 including a non-resilient plate member bonded to said second resilient member, said plate member including means defining a non-circular aperture corresponding to the cross-section of said extended portion whereby said extended portion is received into said aperture in said second resilient member.

21. The mount assembly of claim 19 wherein said second tubular member is formed with a circular cross-section.

22. The mount assembly of claim 15 wherein said first and second tubular members include interior walls and means defining first and second ledges extending radially from said interior walls of said first and second tubular members, respectively, said mount assembly further including an insert having first contact means receivable within said second tubular member for engaging said second ledge and second contact means receivable within said first tubular member to engage said first ledge thereby to hold said first and second tubular members in telescoping relationship with each other.

* * * * *